United States Patent [19]

Tsuji

[11] Patent Number: 4,658,385

[45] Date of Patent: Apr. 14, 1987

[54] OBSTACLE DETECTION SYSTEM

[75] Inventor: Akio Tsuji, Tokyo, Japan

[73] Assignee: Casio Computer Co., Ltd., Tokyo, Japan

[21] Appl. No.: 733,504

[22] Filed: May 10, 1985

[30] Foreign Application Priority Data

May 25, 1984 [JP] Japan ................................ 59-106099

[51] Int. Cl.$^4$ ........................... B62D 1/24; B25J 19/00
[52] U.S. Cl. ........................................ 367/105; 367/96; 367/909; 180/169; 340/904; 901/1; 901/46
[58] Field of Search ........................ 340/904, 909, 943; 367/93, 95, 99, 103, 105, 106, 117, 118, 120, 122, 124, 127, 129, 137, 909, 910; 901/1, 46; 181/123; 343/5 PD, 7 VC, 7 VM; 180/169

[56] References Cited

U.S. PATENT DOCUMENTS

| | | | |
|---|---|---|---|
| 3,493,920 | 2/1970 | Macmunn | 367/96 |
| 3,842,397 | 10/1974 | Sindle | 340/904 X |
| 4,015,232 | 3/1977 | Sindle | 340/904 X |
| 4,240,152 | 12/1980 | Duncan et al. | 367/909 X |
| 4,357,672 | 11/1982 | Howells et al. | 367/127 X |
| 4,467,313 | 8/1984 | Yoshino et al. | 367/909 X |
| 4,490,716 | 12/1984 | Tsuda et al. | 340/904 |
| 4,524,356 | 6/1985 | Kodera et al. | 367/105 X |

FOREIGN PATENT DOCUMENTS 0008455 5/1980 European Pat. Off. .
1379541 1/1975 United Kingdom .
2131642 6/1984 United Kingdom .

Primary Examiner—Charles T. Jordan
Assistant Examiner—Brian S. Steinberger
Attorney, Agent, or Firm—Frishauf, Holtz, Goodman & Woodward

[57] ABSTRACT

An obstacle detection system has a sensor unit including a plurality of ultrasonic transducers and sequentially changes the number of pulses provided to groups of transducers, thereby performing front center sensing, front right sensing and front left sensing. The time between emission of ultrasonic waves and reception of waves reflected by an obstacle is calculated by a timer. A microcomputer computes the distance data and position data of the obstacle in accordance with obtained timer data and sensing region data.

2 Claims, 21 Drawing Figures

FIG. 6A  T3,T4 ON ⎍ 10 PULSES  
FIG. 6B  T2,T5 ⎍ 5 PULSES  
FIG. 6C  T1,T6 ⎍ 1 PULSE

| FIG. 8A | T1,T2 ON⎍ 10 PULSES |
| FIG. 8B | T3 ⎍ 5 PULSES |
| FIG. 8C | T4,T5 ⎍ 1 PULSE |
| FIG. 8D | T6 OFF |

| FIG. 10A | T5,T6 ON ⌐‾⌐ 10 PULSES |
| FIG. 10B | T4 ⌐⌐ 5 PULSES |
| FIG. 10C | T3,T2 ⌐ 1 PULSE |
| FIG. 10D | T1 OFF |

OBSTACLE DETECTION SYSTEM

BACKGROUND OF THE INVENTION

The present invention relates to an obstacle detection system for a self-running robot or the like.

Conventional self-running robot systems have been used in offices and factories to transport articles. An obstacle detection apparatus is required to prevent such a self-running robot from bumping against an obstacle. A conventional obstacle detection apparatus comprises an ultrasonic transducer. Such an ultrasonic transducer is used to detect an obstacle only by distance data. When the route of the self-running robot is simple, the robot can be guided by only the distance data. However, when the route is complicated and the robot must be guided and diverted around obstacles, position data as well as distance data are required. In order to meet such a demand, a shape recognition method by waveform analysis using an ultrasonic sonar system has been developed.

However, such a method requires a long processing time and a large system, resulting in inconvenience.

SUMMARY OF THE INVENTION

It is an object of the present invention to provide an obstacle detection system wherein position data as well as distance data of an obstacle can be detected with a simple system arrangement.

According to the present invention, the number of oscillation pulses from a plurality of ultrasonic transducers is changed to obtain an arbitrary sensing characteristic, and the simple system arrangement guarantees detection of the direction and distance of an obstacle.

In order to achieve the above object of the present invention, there is provided an obstacle detection system, comprising:

ultrasonic wave radiating means including a plurality of ultrasonic transducers; and means for changing the number of pulses for driving the plurality of ultrasonic transducers and supplying signals having different pulse numbers thereto, thereby setting a sensing area.

BRIEF DESCRIPTION OF THE DRAWINGS

Other objects and features of the present invention will be apparent from the following description taken in connection with the accompanying drawings, in which:

FIGS. 6A through 6C are respectively timing charts of control pulses supplied to the respective transmitters during forward sensing represented in FIG. 5;

FIGS. 8A through 8D are respectively timing charts of control pulses supplied to the respective transmitters during right sensing represented in FIG. 7;

FIGS. 10A through 10D are timing charts of control pulses supplied to the respective transmitters during left sensing represented in FIG. 9 and FIGS. 11A and 11B are schematic views for explaining actual obstacle detection when an obstacle is located in the front left direction of the robot.

DETAILED DESCRIPTION OF THE PREFERRED EMBODIMENT

Figure 1:
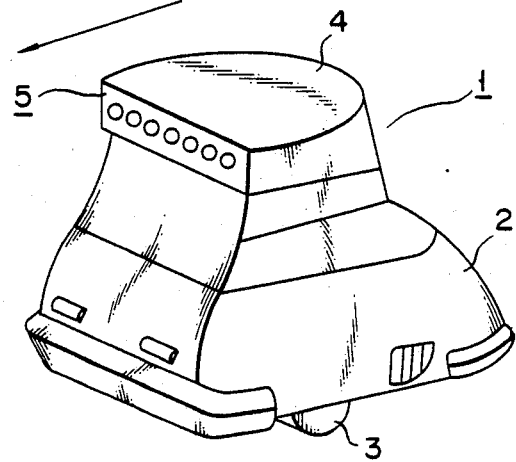
FIG. 1 is a perspective view of a self-running robot which adapts an obstacle detection system of the present invention.
Figure 2:
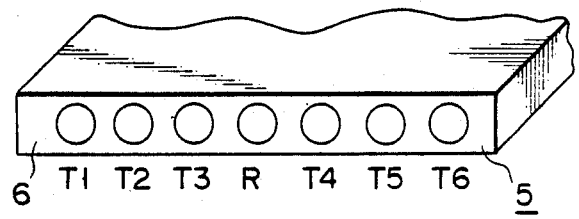
FIG. 2 is an enlarged view of a sensor unit of the robot shown in FIG. 1.

A self-running robot to which the present invention has been adapted will be described with reference to FIGS. 1 and 2. FIG. 1 shows the outer appearance of the robot. A robot 1 has a box-shaped housing 2, and three wheels 3 are mounted at the bottom portion thereof. The wheels 3 are driven by a motor (not shown) to guide the robot 1. A tray 4 is mounted on the housing 2 to carry documents or the like. An ultrasonic sensor unit 5 is mounted in the front surface of the tray 4. As shown in FIG. 2, the unit 5 has a right set of three transmitters T1, T2 and T3 and a left set of three transmitters T4, T5 and T6 which are symmetrical about a central receiver R when viewed from the robot itself. The transmitters T1, T2 and T3 and the transmitters T4, T5 and T6 are linearly aligned at equal intervals. The receiver R and the transmitters T1 through T6 are supported by a sound absorbing material 6, thereby preventing radiation of ultrasonic waves from the rear surfaces of the transmitters T1 through T6.

Figure 3:
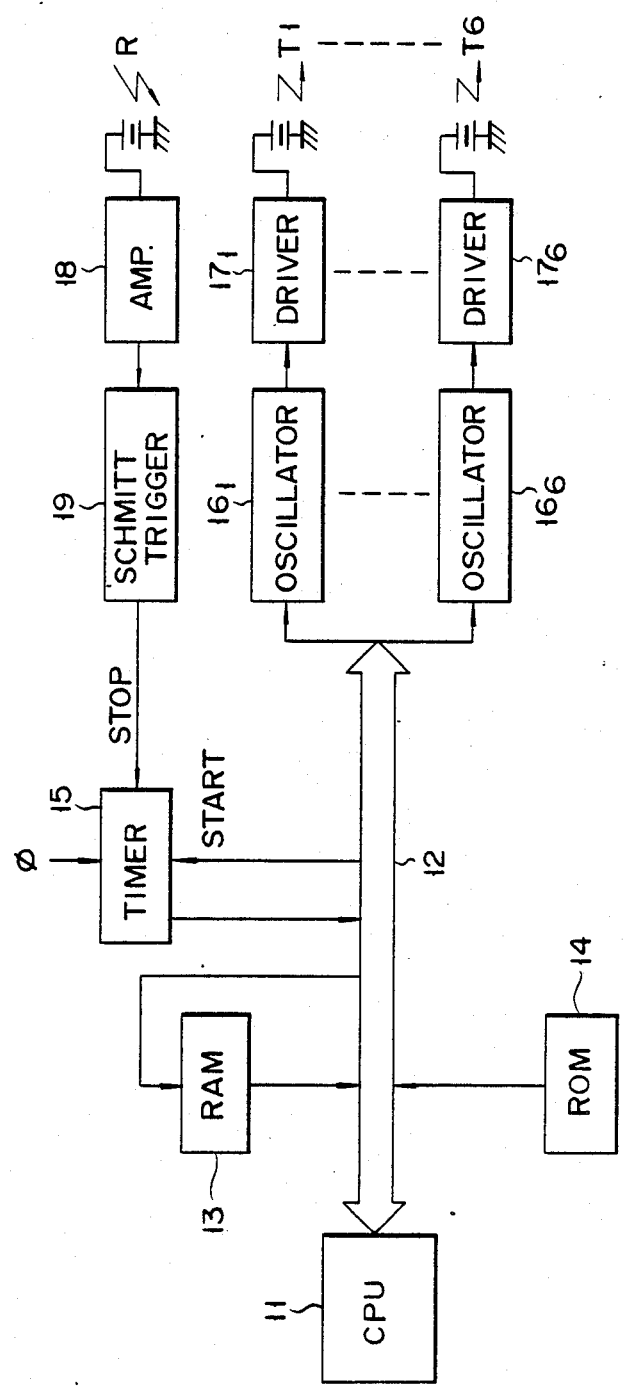
FIG. 3 is a block diagram of a controller for controlling the sensor unit shown in FIG. 2.

A drive control circuit of the unit 5 will be described with reference to FIG. 3. Referring to FIG. 3, a central processing unit (CPU) 11 is connected through a bus line 12 to a RAM 13 for storing processed data, a ROM 14 for storing a control program, and a timer 15 for counting the distance between the robot and an obstacle. The timer 15 is started in response to a clock pulse $\phi$ upon generation of a start instruction from the CPU 11. The CPU 11 generates a control signal to first through sixth oscillators $16_1$ through $16_6$ through the bus line 12. Each of the oscillators $16_1$ through $16_6$ generates a 37-, 40- or 43-kHz signal in response to the control signal from the CPU 11. At the same time, the ON/OFF operation of these oscillators is controlled by the control signal. Frequency selection is performed to properly receive the wave reflected by the obstacle. The phase of the wave reflected by the obstacle varies in accordance with the material and surface shape of the obstacle. Under certain conditions, the phase of a wave transmitted from the transmitter is often shifted by 180 degrees from the phase of a wave reflected by the obstacle. In this case, the receiver cannot receive such a reflected wave. In order to prevent this, the ultrasonic waves are transmitted at three different frequencies. Oscillation outputs from the oscillators $16_1$ through $16_6$ drive drivers $17_1$ through $17_6$, respectively. The drivers $17_1$ through $17_6$ drive the transmitters T1 through T6, respectively, thereby emitting ultrasonic waves from the robot 1 in the forward direction. The ultrasonic waves emitted from the transmitters T1 through T6 are reflected by an obstacle, if any, and the waves reflected by the obstacle are received by the receiver R. The reflected waves received by the receiver R are amplified by an amplifier 18. A signal amplified by the amplifier 18 is shaped by a Schmitt trigger circuit 19 and is supplied as a stop signal to the timer 15. In this case, the count of the timer 15 is supplied to the CPU 11 through the bus line 12.

Figure 4A:
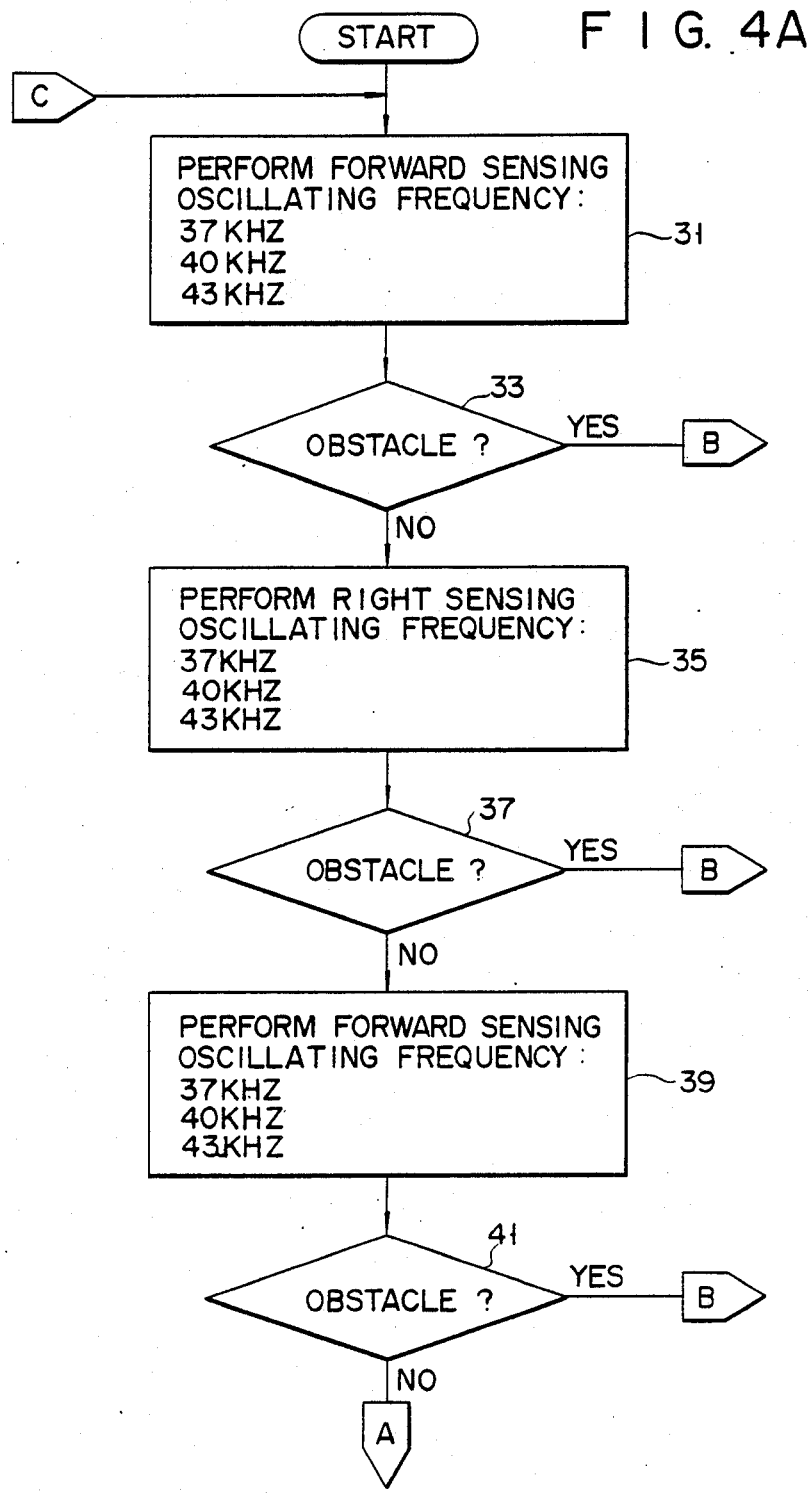
FIGS. 4A and 4B are flow charts for explaining the operation of the controller shown in FIG. 3.
Figure 4B:
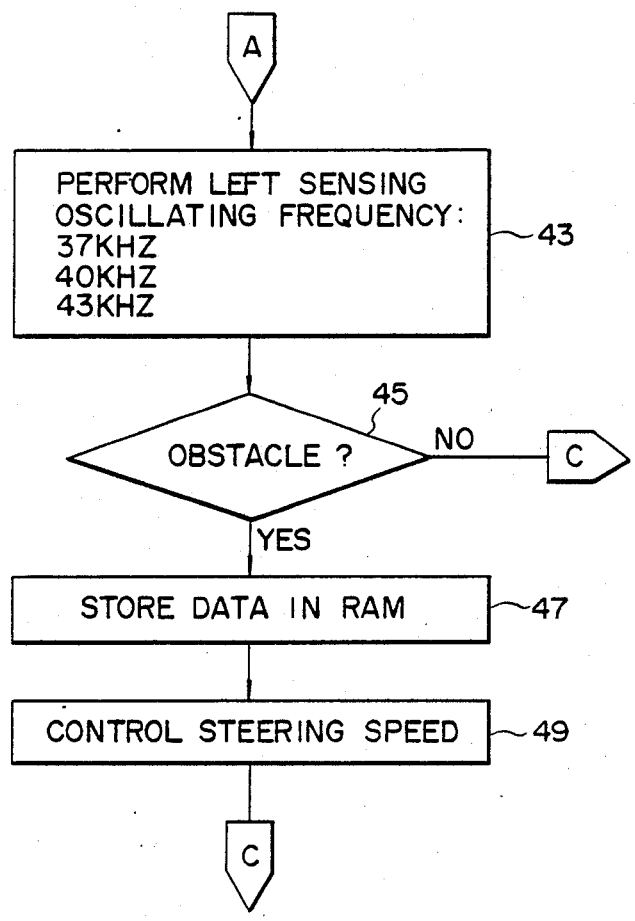
Figure 5:
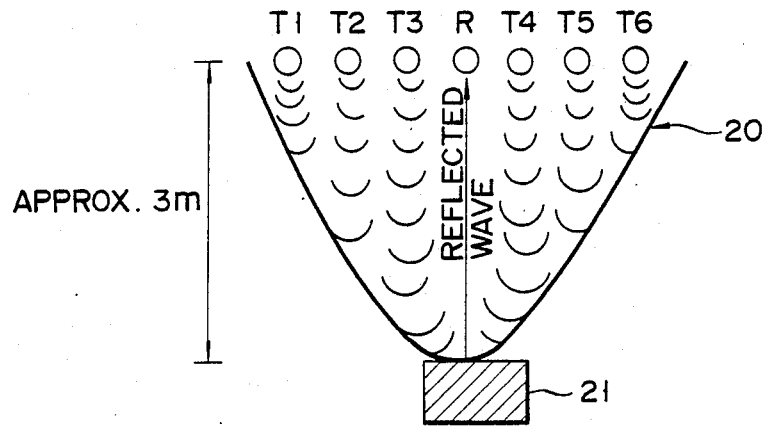
FIG. 5 is a schematic view showing the radiation state of the ultrasonic waves when forward sensing is to be performed.
Figure 7:
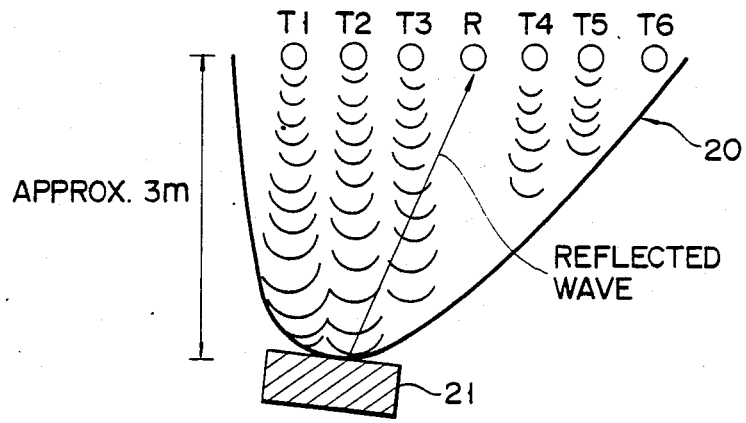
FIG. 7 is a schematic view showing the radiation state of the ultrasonic waves when right sensing is to be performed.

The operation of the obstacle detection system of this embodiment will be described with reference to FIGS. 4A and 4B. The CPU 11 supplies an oscillation instruction to the oscillators $16_1$ through $16_6$ at time intervals, e.g., every 40 msec to detect the presence/absence of an obstacle along the route of the robot 1. As shown in the flow charts of FIGS. 4A and 4B in the case of obstacle detection, three types of sensing operations (i.e., forward sensing, right sensing and left sensing) are performed. Three frequencies (i.e., 37 kHz, 40 kHz and 43 kHz) are repeatedly used to eliminate obstacle detection errors caused by interference of reflected waves. In step 31, forward sensing is performed. The CPU 11 supplies a 37-kHz oscillation instruction to the oscillators $16_1$ through $16_6$ to cause the drivers $17_1$ through $17_6$ to drive the transmitters T1 through T6, respectively. In this case, as shown in FIGS. 5 and 6A, the number of pulses emitted from the central transmitters T3 and T4 is 10, and a possible detection range is about 3 m. The number of pulses emitted from the transmitters T2 and T5 immediately adjacent to the transmitters T3 and T4 is 5, as shown in FIG. 6B, and a possible detection range is about 2 m. The number of pulses generated from the outermost transmitters T1 and T6 is one, as shown in FIG. 6C, and a possible detection range is 1 m or less. An obstacle detection sensitivity at the central region of a resulting parabolic-like sensing area 20 which is produced in front of the robot 1 is thus at a maximum, and the sensitivity is gradually decreased toward the peripheral region of the sensing area 20.

When the CPU 11 starts driving the oscillators $16_1$ through $16_6$, the CPU 11 causes the timer 15 to start. When an obstacle 21 is present at the central portion in front of the robot 1 and the robot 1 approaches the obstacle 21 to within 3 m therefrom, the receiver R receives the waves reflected from the obstacle 21. The reflected waves are amplified by the amplifier 18. The amplified signal is shaped by the Schmitt trigger circuit 19. An output from the circuit 19 is supplied as a stop signal to the timer 15. The counting operation of the timer 15 is thus stopped, and the current count is supplied to the CPU 11 through the bus line 12, thereby calculating the distance between the robot 1 and the obstacle 21. For example, when the count of the timer 15 represents 30 msec, the distance between the robot 1 and the obstacle 21 is about 3 m. When sensing at the 37-kHz frequency is completed, sensing is continuously performed at 40- and 43-kHz frequencies. As a result, the CPU 11 checks in step 33 whether or not an obstacle is detected. If NO in step 33, the flow advances to step 35, and right sensing is performed. For right sensing, the CPU 11 supplies an oscillation instruction to the oscillators $16_1$ through $16_6$ to cause the drivers $17_1$ through $17_6$ to drive the transmitters T1 through T6, respectively, in the following manner.

The number of pulses generated from the right transmitters T1 and T2 is 10, as shown in FIG. 8A, and the possible detection range is about 3 m; the number of pulses generated from the transmitter T3 next to the transmitter T2 is 5, as shown in FIG. 8B, and the possible detection range is less than about 2 m; and the number of pulses generated from the transmitters T4 and T5 is 1, as shown in FIG. 8C, and the possible detection range is 1 m or less. In this case, no pulses are generated from the leftmost transmitter T6, as shown in FIG. 8D. In other words, the obstacle detection sensitivity at the right region of the resulting parabolic-like sensing area when viewed from the robot 1 is maximum, and the sensitivity of the left region from the center thereof is gradually decreased. In this manner, the obstacle is detected by using three frequencies.

Figure 9:
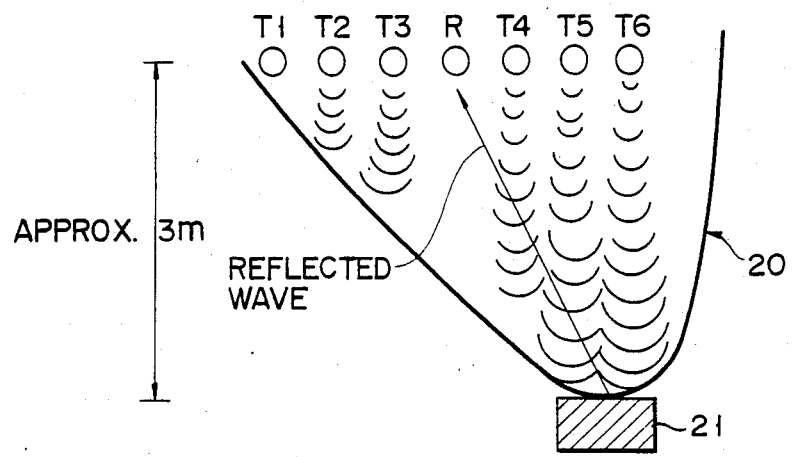
FIG. 9 is a schematic view showing the radiation state of ultrasonic waves when left sensing is to be performed.

Thereafter, the CPU 11 checks in step 37 whether or not an obstacle is present. If NO in step 37, the flow advances to step 39 to perform forward sensing in the same manner as in step 31. The CPU 11 checks again in step 41 whether or not an obstacle is present. If NO in step 41, left sensing is performed in step 43. For left sensing, the CPU 11 supplies the oscillation instruction to oscillators $16_1$ through $16_6$ to cause the drivers $17_1$ through $17_6$ to drive the transmitters T1 through T6 in the following manner. The number of pulses generated from the left (when viewed from the robot) transmitters T5 and T6 is 10, as shown in FIG. 10A, and the possible detection range is about 3 m; the number of pulses generated from the transmitter T4 is 5, as shown in FIG. 10B, and the possible detection range is less than about 2 m; and the number of pulses generated from the transmitters T2 and T3 to the right of the receiver R is 1, as shown in FIG. 10C, and the possible detection range is less than 1 m. In this case, the rightmost transmitter T1 is not used, as shown in FIG. 10D. In other words, the obstacle detection sensitivity of the left region of the resulting parabolic-like sensing area 20 (FIG. 9) in front of the robot is maximum, and the sensitivity of the right region from the center of the sensing area is gradually decreased. Ultrasonic waves having three frequencies are sequentially emitted to detect the obstacle. The CPU 11 checks in step 45 whether or not an obstacle is present. If NO in step 45, steps 31 through 45 are repeated.

However, if YES in steps 33, 37, 41 and 45, i.e., when the CPU 11 determines that an obstacle is detected, direction and distance data are stored in the RAM 13 of FIG. 3 in step 47. In step 49, steering control and velocity control are performed in accordance with the data stored in the RAM 13, thereby changing the moving direction of the robot 1 so as to clear the obstacle 21, and thereafter causing the robot 1 to return to the predetermined route.

Figure 11A:
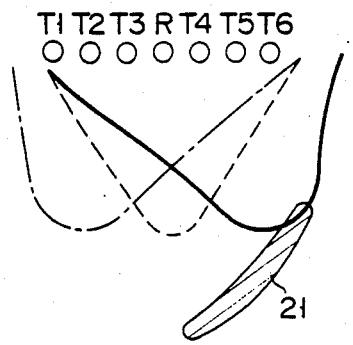
Figure 11B:
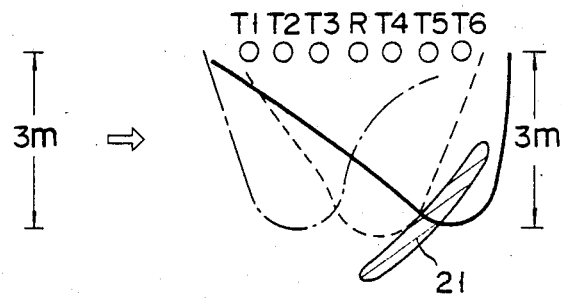

The robot 1 with the sensor unit 5 moves while changing the sensing area and recognizes the state of the obstacle 21 as well as the direction and distance with respect thereto. For example, as shown in FIG. 11A, when the obstacle 21 is located at a front left position of the robot 1, the obstacle 21 is detected by left sensing performed in step 43 of FIG. 4B when the robot 1 approaches to within a distance of 3 m from the obstacle 21. As shown in FIG. 11B, when the robot 1 is further moved, forward sensing (step 31 in FIG. 4A) and left sensing (step 43 in FIG. 4B) detect the obstacle 21. Therefore, the robot 1 can recognize the state (in this case, the obstacle is located from the central front to the front left position) of the obstacle 21 in accordance with the detection result.

In the above embodiment, each set of three transmitters T is arranged at each side of the receiver R. However, the present invention is not limited to the above arrangement and can be applied to other combinations. The frequencies of the transmitters T are not limited to those selected in the above embodiment.

What is claimed is:

1. In an obstacle detection system including ultrasonic wave radiating means comprising a plurality of ultrasonic transducers, and means for supplying transmitting pulses for driving each transducer, the improvement comprising:
    said ultrasonic transducers are arranged in a row symmetrically about a central transducer with a rightmost and a leftmost transducer relative to said system, the transducers being arranged to radiate ultrasonic waves in a forward direction in response to transmitting pulses;
    said means for supplying transmitting pulses includes drive control means for cyclically performing first to third radiating operations, wherein during said first operation the number of transmitting pulses supplied to central ultrasonic transducers is set to a maximum and the number of transmitting pulses supplied to each remaining ultrasonic transducer is set to decrease from said maximum number according to the distance of said each transducer from said central transducer;
    wherein during said second operation said drive control means sets the number of transmitting pulses supplied to said rightmost ultrasonic transducer to a maximum and the number of transmitting pulses supplied to each remaining transducer is set to decrease from said maximum number according to the distance of said each transducer from said rightmost transducer; and
    wherein during said third operation said drive control means sets the number of transmitting pulses supplied to said leftmost ultrasonic transducer to a maximum and the number of transmitting pulses supplied to each remaining transducer is set to decrease from said maximum number according to the distance of said each transducer from said leftmost transducers; and
    said drive control means includes means for setting the number of transmitting pulses supplied to each of said ultrasonic transducers during said first to third radiating operations, so that a changing parabolic-like sensing region is produced by ultrasonic waves radiated by said transducers in said forward direction in an obstacle detection region.

2. A system according to claim 1, further comprising:
    ultrasonic wave receiving means coupled to said central transducer for receiving waves reflected by an obstacle in said detection region;
    timer means for counting elapsed time, including means for starting said counting upon emission of ultrasonic waves by said transducers and for stopping said counting in response to a signal received by said ultrasonic wave receiving means; and
    microcomputer means coupled to said timer means and forming a part of said drive control means, for computing relative distance and position data of an obstacle in said detection region, in accordance with time data obtained from said timer means during each of the first to third radiating operations of said drive control means.

* * * * *